United States Patent [19]

Krivohlavek

[11] Patent Number: 5,505,877
[45] Date of Patent: Apr. 9, 1996

[54] MAKING MULTIPLE PHASE EMULSION OR GEL

[76] Inventor: Dennis Krivohlavek, 2505 Trailwood Dr., Claremore, Okla. 74017

[21] Appl. No.: 67,721

[22] Filed: May 26, 1993

Related U.S. Application Data

[63] Continuation-in-part of Ser. No. 775,435, Oct. 15, 1991, abandoned.

[51] Int. Cl.$^6$ ................................ B01J 13/00; C10L 1/32
[52] U.S. Cl. .................... 252/314; 44/301; 149/118; 252/308; 252/311.5; 252/312; 252/315.1; 252/315.4; 252/309; 366/177.1
[58] Field of Search .................... 149/118; 252/308, 252/311.5, 312, 314, 315.1, 315.4; 44/301

[56] References Cited

U.S. PATENT DOCUMENTS

| | | | |
|---|---|---|---|
| 4,859,245 | 8/1989 | Schilling et al. | 252/311.5 X |
| 5,268,029 | 12/1993 | Demangeon et al. | 252/311.5 X |
| 5,283,001 | 2/1994 | Gregoli et al. | 252/314 |

*Primary Examiner*—Richard D. Lovering
*Attorney, Agent, or Firm*—Head, Johnson & Kachigian

[57] ABSTRACT

A multiple phase emulsion or gel including a water phase within at least one oil phase in which either or both of the phases contains one or more chemical moieties selected from a group consisting of organic compounds that have multiple hydroxide functionality, cholesterol, lecithin, multiple valent metal ions, saponified organic acids, unsaponified organic acids, saponified organic bases, unsaponified organic bases, nonionic surfactants and amphoteric compounds. The water and oil phase is also within a second water or oil phase in which the second water or oil phase is obtained by mixture of chemical moieties selected from a group consisting of organic acids, tall oil products, organic bases, phosphates, sulfates, nonionic chemicals, amphoterics and betaines.

4 Claims, 2 Drawing Sheets

MAKING MULTIPLE PHASE EMULSION OR GEL

CROSS-REFERENCE OF THE APPLICATION

This application is a continuation-in-part application of U.S. patent application Ser. No. 07/775,435, filed Oct. 15, 1991, entitled "MULTIPLE PHASE EMULSIONS IN BURNER FUEL, COMBUSTION, EMULSION and EXPLOSIVES APPLICATIONS", now abandoned.

BACKGROUND OF THE INVENTION

1. Field of the Invention

The invention relates to the creation and use of multiple phase emulsions or gels to produce a product suitable for burner fuel, combustion or explosive applications.

2. Description of the Related Art

Burner fuel and or combustion and or explosive emulsions or gels of various types have been known in the art for many years. To date, all the emulsions for the various combustion applications known in the art involve the basic two phase system of emulsification. Generally speaking, these systems or types of burner fuel, combustion or explosive emulsions or gels have involved various chemical systems or combinations of chemicals of a synthetic or biological origin to create emulsions or gels known as oil in water (O/W) or water in oil (W/O) type emulsions or gels.

Some of the advantages of the basic emulsion systems described above are to allow for better atomization of a burner fuel oil or other combustible or explosive material to create a more efficient burn, combustion or explosive process. While the basic O/W emulsion system allows for small particle size oil droplet emulsions and in many cases lower product viscosity than the fuel oil alone, they also force the burn or combustion process to evaporate the surrounding water and consume the oil droplet from the oil droplets' outer surface to the center as in a conventional nozzle atomization of the fuel oil or combustion components alone. The burn or combustion efficiency of the conventional O/W emulsion system is then dependent upon the size of the oil droplet and amount of water in the system.

There also exists several advantages to the basic W/O emulsion systems. Among some of the advantages to the W/O emulsion are that they allow for a secondary atomization of the emulsion droplet by the exploding water droplet that has been trapped as the discontinuous phase when making the initial W/O emulsion. Another advantage of the W/O emulsion is that oil is on the external phase of the droplet and therefore burns or combusts similar to a conventional burner fuel or combustion process. Also, excess water in the W/O emulsion can greatly decrease burn or combustion efficiency. Further, efficiency of the W/O emulsion is also greatly dependent upon the mechanical atomization created by the nozzle just prior to burning as well as the secondary atomization created by the water droplet exploding and further atomizing the mechanically atomized water in oil droplet.

These two phase emulsion systems have offered the industry various advantages depending upon the chemistry of the emulsion system, the type of burner fuel or combustible or explosive products being emulsified and other related problems specific to the overall emulsion system under study at the time. The two phase systems have in the past limited themselves to either oil in water or water in oil type systems.

Previous to the advent of this technology, those skilled in the art of burner fuel or combustion or explosive emulsions tried to maximize the advantages of one of these individual two phase systems (either W/O or O/W) and minimize its disadvantages. It is the intent of this technology to combine the advantages of both the O/W and the W/O burner fuel or combustion or explosion emulsions into a single multiple phase (for example three alternating phases of W/O/W or O/W/O) burner fuel or combustion or explosive emulsion product there by minimizing the disadvantages of the individual two phase type emulsion. This new multiple phase burner fuel or combustion or explosion emulsion allows for the advantages of each of the two phase type emulsions (the W/O emulsion and the O/W emulsion) by first forming a W/O emulsion and then emulsifying this W/O product again into a continuous water phase to create the advantages of the W/O and O/W emulsions and the formation of the final multiple (in this case three) phases of W/O/W that is the composition this new burner fuel or combustion or explosive emulsion. The skilled burner fuel, combustion or explosives technologist could not, however, capitalize on the inherent advantages offered by the combination of an oil phase discontinued in water (O/W) and a water phase discontinued in oil (W/O) in alternating fashion (i.e., multiple phase emulsions of at least W/O/W or O/W/O) in one single emulsion system alone.

SUMMARY OF THE INVENTION

Specifically, this invention describes the procedures, general chemical groups, and general use levels of those chemical groups that may be used to create a multiple phase emulsion or gel. The multiple phase emulsion or gel created as a result of this disclosure possess advantages for burner fuel, combustion or explosives applications previously prohibitive if each phase of the emulsion system were a discrete separate system. Therefore advantages such as expanded physical properties of the final multiple phase emulsion product and combinations of the chemicals used in the creation of the multiple phase emulsion product to enhance the burn or combustion or explosion and burner or combustion or explosion effluents may now be obtained.

It is the intent of this technology to combine the advantages of both the O/W and the W/O burner fuel or combustion or explosion emulsions into a single multiple phase (for example three alternating phases of W/O/W or O/W/O) burner fuel or combustion or explosive emulsion product there by minimizing the disadvantages of the individual two phase type emulsion. This new multiple phase burner fuel or combustion or explosion emulsion allows for the advantages of each of the two phase type emulsions (the W/O emulsion and the O/W emulsion) by first forming a W/O emulsion and then emulsifying this W/O product again into a continuous water phase to create the advantages of the W/O and O/W emulsions and the formation of the final multiple (in this case three) phases of W/O/W that is the composition this new burner fuel or combustion or explosive emulsion.

A further extrapolation of the technology of multiple phase emulsions would be the combination of burnable, combustible or explosive solids, oils or various burnable, combustible or explosive hydrocarbons or oils and water to form solid/oil/water/oil, solid/water/oil/water or solid/oil-#1/oil-#2 where oil-#1 is immiscible and/or a discontinuous phase in oil-#2 or similarly arranged or combined multiple phase emulsion(s) that may or may not contain water.

It is the purpose of the teachings of this disclosure to illustrate at least two mechanical methods of manufacturing a multiple phase and in particular a three phase emulsion and to describe suitable chemicals for the manufacture of each mechanical method. Also disclosed in the teachings of this patent are the inherent advantages offered to the industry by the creation of a multiple phase emulsion. Some of the advantages of the multiple phase emulsion are: improved cost effectiveness due to the second atomization of the oil by the exploding internal water phase; improved physical properties such as low viscosity to improve pumpability and the resulting mechanical atomization of the burner or physical atomization nozzle due to the low emulsion viscosity, improved storage stability; a more efficient burn or combustion or explosion process which would result from the above improvements which may well result in lower emissions.

The teaching of this disclosure would not limit themselves to liquids in multiple phase combinations but would also illustrate the utility of the combination of various gases, liquids and solids. These combinations of gases, liquids and solids could have many functions in a product such as but not limited to being a continuous or discontinuous phase or a part of or the primary portion of the burner fuel, combustion or explosive component of a multiple phase emulsion system. Combinations of burnable, combustible or explosive or non burnable, combustible or explosive solids with various oils and water would offer the burner fuel, combustion, emulsion and explosives industry many of the same advantages listed above for the general case of multiple phase emulsions.

DETAILED DESCRIPTION OF THE PREFERRED EMBODIMENTS

The overall teachings of the preferred embodiment are to illustrate the utility of multiple phase emulsions in burner fuel, combustion or explosives applications. Multiple phase emulsions or systems may consist of any combination of immiscible solids and or liquids combined in any order such that their respective dispersions may be separated one from the other in an alternating fashion. Further, such multiple phase emulsions or systems and their dispersions may be accentuated by such additives as surface-active agents, finely divided solids, or other such partitioning or dispersing agents.

Direct applications of the above definition of multiple phase emulsions or systems to burner fuel, combustion and or explosives technology will not only allow for multiple phases of immiscible or undissolved solids but also allow for the incorporation or emulsification of solids suspended in fluids. These solid suspensions may then be incorporated or emulsified into other immiscible fluids or discontinuous phases in combinations with a continuous phase.

Figure 1:
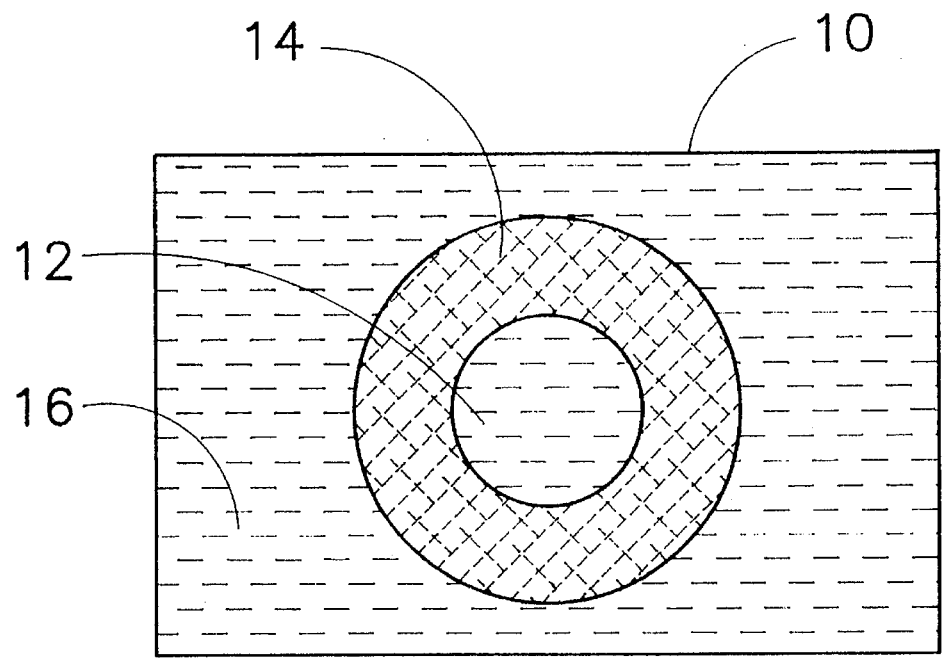
FIG. 1 is a top view of a water/oil/water multiple phase emulsion as typically viewed under a microscope.
Figure 2:
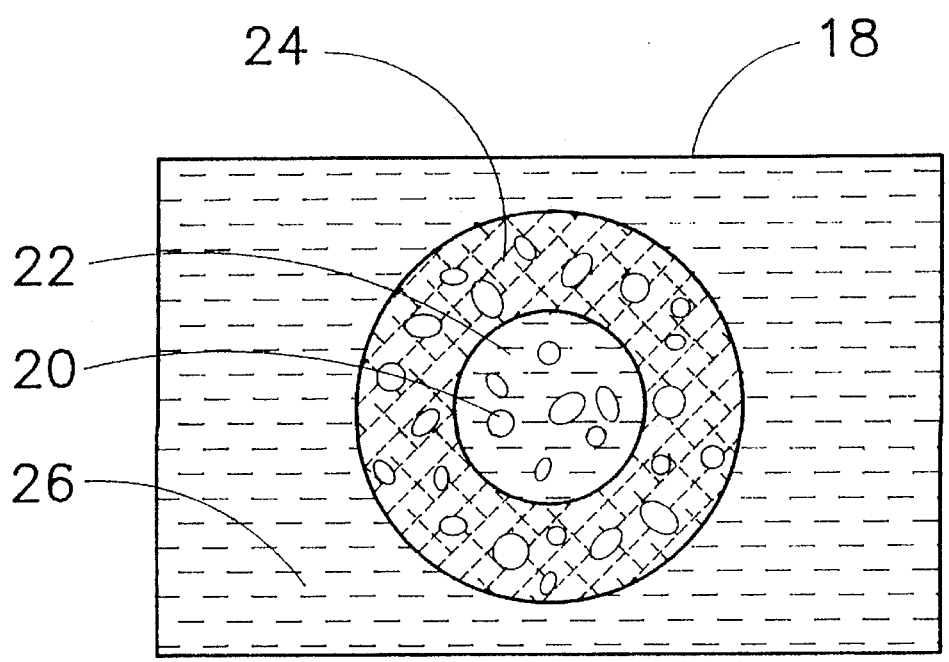
FIG. 2 is a top view of a four phase emulsion containing solid particulates in the discontinuous phase as typically viewed under a microscope.

An illustration of typical final product forms of multiple phase emulsions or systems are illustrated in FIG. 1 and FIG. 2. In FIG. 1 a three phase emulsion 10 is depicted which may be a suitable burner or combustible fuel that may be used as boiler fuel or in similar applications. In this multiple phase emulsion the first or most internal phase 12 is comprised of water. This water phase 12 is or has been emulsified or made discontinuous into the second phase which is an external or continuous oil phase 14. This two phase emulsion is then emulsified into a final continuous water phase 16. This final multiple (three) phase emulsion system 10 would have not only the physical preatomization of an oil droplet dispersed in the final continuous water phase 16 (the conventional oil-in-water emulsion which is commonly abbreviated O/W emulsion) with its physical atomization by the burner or combustion nozzle but also have the advantage of the most internal water phase exploding and infinitely fragmenting its surrounding oil droplet 14 (the conventional water-in oil emulsion which is commonly abbreviated W/O emulsion) there by creating an infinite quantity of oil phase surface area for burning or combustion purposes.

The ability of this multiple phase emulsion or system to combine the advantages of both a oil in water and the water in oil emulsion into one multiple phase emulsion or system for combustion purposes is in and of itself an advancement in the current state of the art of burner or combustion fuel and or explosives technology. Other specific advantages of a multiple phase emulsion will vary depending upon the nature of each phase and its relation or position within the total system.

Some general advantages of the above described multiple (three) phase water oil water emulsion (commonly abbreviated W/O/W emulsion) or system 10 of FIG. 1 would be: 1) less emulsion settling problems with the oil phase as there is water dispersed or emulsified within the oil phase which could create buoyancy effects; 2) due to the improved settlement properties created by the most internal water phase heavier or higher specific gravity oils such as asphalts, tars, pitches and the like may be emulsified for burner or combustion fuel applications; 3) the heavier oils such as asphalts, tars, pitches and the like may expect low pumping viscosities and improved nozzle atomization as well as; 4) an improved burning efficiency due to the exploding most internal water phase. Lighter or lower specific gravity oils such as No. 6 burner fuels, No. 2 diesel, kerosine or other lighter fuel oils such as gasoline (which could be used in motor vehicles for transportation purposes) would expect less creaming due to the settling effect of the heavier most internal water phase; 5) spent,by product or other wise useless oils and or their burnable suspended solids which result from the food or wood processing industries.

FIG. 2 illustrates the application of a four phase system 18 which incorporates a solid 20 dispersed in a water phase 22 which is in turn emulsified into an oil phase that is further emulsified into a final continuous phase of water 26. Three typical types of solids that may be useful in this type of multiple phase emulsion are: 1) finely ground coal and; 2) finely ground coke and; 3) explosive organic and or inorganic solids. In the solid burner or combustion fuel industry, it is a typical practice to use finely ground solids or aqueous slurries in an attempt to improve handling and burning or combustion characteristic.

The application of this new multiple phase emulsion technology will offer easier processing due to the pumping of a liquid as opposed to a solid or slurry. A second atomization of the solids suspended in the innermost water droplet after the emulsion leaves the nozzle may now be achieved. This system also offers the potential for adding solid burner fuels or other combustible or explosive solids to the oil portion of the emulsion system as well as the aqueous phases there by increasing the total amount of solid burner, combustible or explosive fuel in the system. Another feature of multiple phase emulsion systems such as this would be the option of having the oil portion of the multiple phase emulsion system add to the total burner, combustible or explosive fuel portion of the system.

Other areas of burner, combustion or explosive fuel technology that may well benefit from the teachings of this disclosure may be explosives and solid or semisolid fuel propellants such as solid rocket motor fuels and the like.

Figure 3:
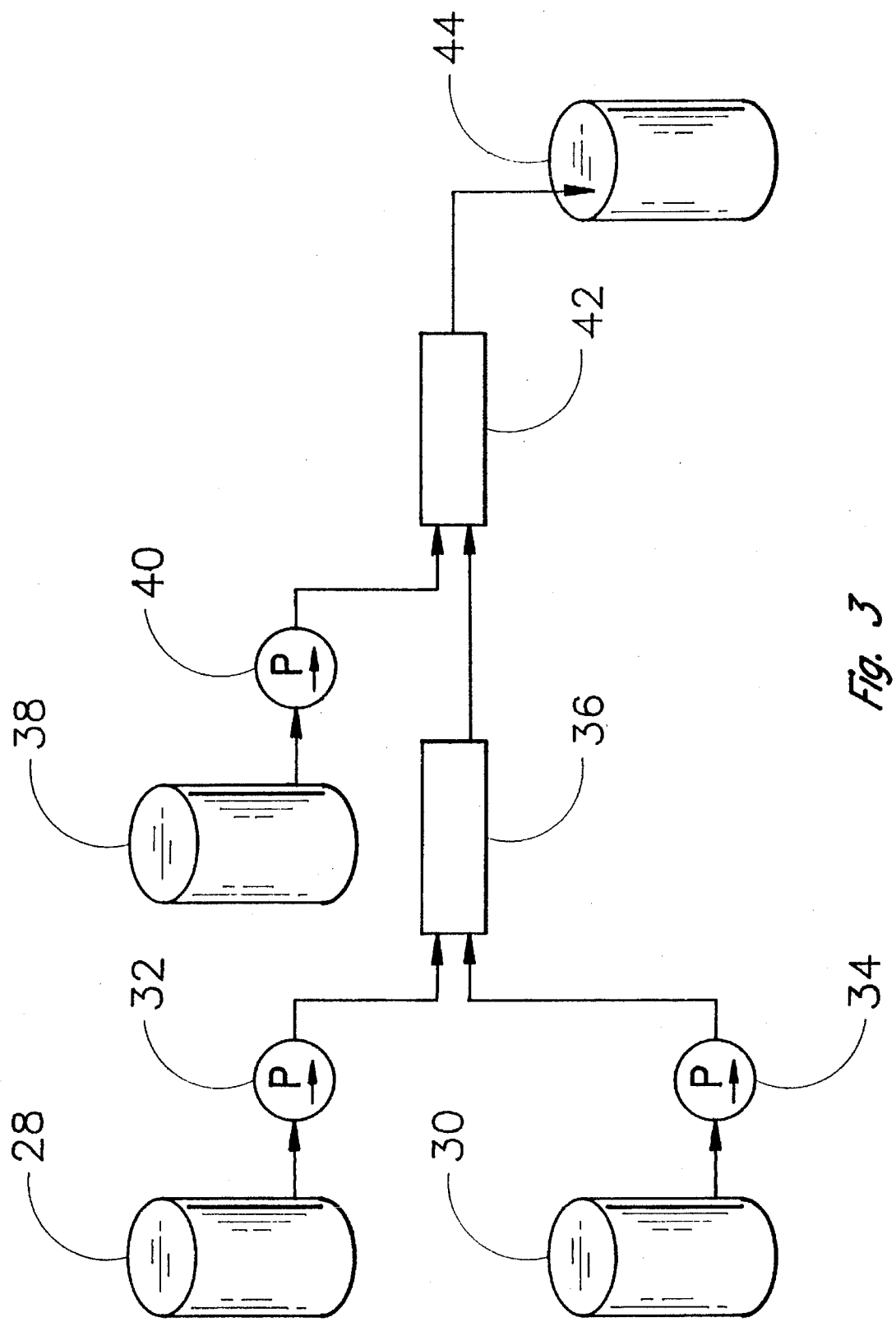
FIG. 3 depicts an apparatus for making a water/oil/water multiple phase emulsion or gel.

FIG. 3 depicts an apparatus for making multiple phase emulsions. Chemical components used to create the discontinuous water in oil phase are stored in containers 28 and 30. Pumps 32 and 34 are used to transport the chemical components from storage containers 28 and 30 to the first mixing apparatus 36. Mixing apparatus 36 could be a colloid mill or some other suitable mixing apparatus fop the creation of emulsions. The resultant emulsion from the first mixing apparatus 36 is transported to a second mixing apparatus 42. The chemical compound used to create the continuous water phase of the resultant multiple phase emulsion is stored in container 38. Pump 40 propels this chemical compound from storage container 38 to where it is introduced into the second mixing apparatus 42 along with the resultant water in oil emulsion from the first mixing apparatus 36. The resultant water/oil/water emulsion is the effluent from the second mixing apparatus 42 which can be stored in a suitable container 44. It is readily apparent that additional chemical compounds can be introduced into subsequent mixing apparatus in order to create additional phases.

A general procedure for the manufacture of multiple phase emulsions would involve the use of a suitable mixing device capable of creating emulsions between two initially discrete components upon their subsequent introduction into the mixing device. This resulting emulsion would then be used as one of the components in the next emulsification step between itself and the next component of emulsion of the total emulsion system. The product or emulsion of this second process step could then be further combined with other components to continue in step wise fashion the order of the system.

The exact equipment required and number of pieces of equipment needed would vary depending upon the components (oils, solids, water, emulsifier, etc.) of the emulsion system and their respective physical properties or state before emulsification. The exact conditions for emulsification would also be dependent upon these same physical properties or state. In general those schooled in the art of emulsion technology may expect to use emulsification equipment and mechanical devices germane to the components of the emulsified burner, combustion or explosive fuel emulsion to be used in the manufacture of each portion of the final multiple phase emulsion.

Typical emulsification equipment may be but is not limited to colloid mills of various types and or configurations, homogenizers or various types and or configurations, in line mixers of various types and or configurations, static mixers of various types and or configurations, sonicators of various types and or configurations and or other equipment or techniques which are known to those skilled in the art of emulsification to create discontinued phases into or as a part of continuous phases as well as either low (<500 psig) or high (>=500 psig) pressure variations of any or all of the above.

Among the related process equipment normally necessary would be but not limited to the appropriate pumps, metering devices, heaters, heat exchangers, cooling equipment and other suitable equipment necessary due to the physical properties or state of the individual components of the multiple phase emulsion system. The use of equipment or techniques known to those skilled in the art of either wet or dry (or both) grinding technology would expect to use grinding or pulverizing equipment germane to the components of the technology. Typical equipment expected to be utilized in grinding or pulverizing would be but is not limited to jaw, cone, plate and or like crushers or pulverizers, hammer mills, ball mills and other techniques and or types of wet and or dry grinding or pulverizing equipment known to reduce solid particles in size. Related equipment or techniques would be capable of discriminating the particle size and rerouting oversized material appropriately. Examples of equipment used to discriminate particle size may be but is not limited to sieves and centrifugal separation or other types of separation techniques known to those skilled in the art of solids separation processing.

Another general procedure or technique for the manufacture of a multiple phase emulsion would involve the art of balancing the chemical emulsifier demands of the components of the multiple phase emulsion system. In a single pass through a single mixer or emulsifying apparatus an emulsion is created which forms both water in oil emulsions formed while at the same time oil in water emulsions form such that essentially the water is in oil emulsion is emulsified into a continuous water phase. This technique will most likely be accomplished by combining the chemicals which form water in oil emulsions with chemicals that form oil in water emulsions into the emulsion system and processing through only one piece of emulsion manufacturing equipment. This technique then combines two separate process steps into only one process step and eliminates the need for a second piece of emulsion manufacturing equipment.

Chemicals to produce or aid in the production of acceptable water in oil portions of the multiple phase emulsions are but not limited to: 1) organic compounds that have multiple hydroxide functionality such as waxes, poly vinyl alcohol or other alcohols; 2) cholesterol; 3) certain lecithin compounds known to product W/O emulsions; 4) multiple valent metal ions which may or may not be introduced into the emulsion system in water soluble forms such as but not limited to hydroxides, organic metallic compounds or complexes, salts, and or sulfates that may or may not be used singularly or in combination may be but not limited to Aluminums, Bariums, Berylliums, Borons, Calciums, Chromiums, Irons, Leads, Magnesiums, Manganese, Nickels, Strontiums and other multiple valient ions which are either organic or inorganic moieties; 5) saponified and or unsaponified organic acids or bases such as but not limited to fatty acids, tall oil products or amines, sulfates and sulfites and the like and phosphates and like or similar compounds; 6) nonionic surfactants such as but not limited to nonyl phenol ethoxylates and like or similar compounds; 7) amphoteric compounds.

In general, any chemical; or chemical system known to produce W/O emulsions may used to aid in or create the emulsification or partitioning of the water phase to create the continuous oil phase that are known to those skilled in the art of water in oil emulsion technology may be selected for use in the application of the teachings of this disclosure. Selection of a specific chemical or chemical system or combinations of chemicals for the purpose of creating W/O emulsions will be dependent upon the nature of the components (oils, solids, other chemicals and or water, etc) being selected for emulsification.

Chemicals to produce a (the) continuous water phase of a multiple phase emulsion may be selected from but not limited to any number of anionic, nonionic, amphoteric or cationic emulsifiers or partitioning aids known to those skilled in the art of oil in water emulsification technology. The exact selection of the specific chemical or chemical system or combinations of chemicals for the purpose of creating a O/W emulsion will be dependent upon the nature of the components (oils, solids, other chemicals and or water, etc) being selected for emulsification. Some typical chemicals that may be selected for use in the formation of a continuous water phase may be but is not limited to: 1) organic acids such as but not limited to fatty acids and or tall oil products and their derivatives; 2) organic bases such as but not limited to amines and or phosphates and or sulfates and or their derivatives; 3) nonionic chemicals such as but not limited to ethoxylated nonyl phenols, organic acids and or organic bases and their derivatives; 4) amphoterics such as but not limited to those known as betaines and or other such compounds commonly classified as amphoterics; 5) other like and or similar chemical moieties as those described above known to produce or aid in the production of continuous water phase emulsion systems.

Other chemical moieties or systems that may be known to those schooled in the art of solids dispersion or floatation technology may be selected from but not limited to: 1) Various gums, thickeners and suspension agents as derived form beans, wood, aquatic or other plant forms such as but not limited to various types of guar, cellulose, seaweed derivatives; 2) Various types of chemical moieties such as but not limited to those derived from micro organisms such as but not limited to those commercially known as Xanthan, Rhamsan, Welan, and or Gellan gums some of which may be but are not limited to derivatives of Xanthomonas campestris (a bacterium), alcaligenes strain ATCC 31961, alcaligenes strain ATCC 31555 and or Pseudomonas strain ATCC 31461 respectively by either aerobic or anaerobic processes; 3) Various mineral and/or clay derivatives such as but not limited to those clays known as Bentonite clays and like or similar clays; 4) various synthetic chemical moieties such as but not limited to polyacrylamides; 5) Various types and or derivatives of cationic, anionic, nonionic and amphoteric chemicals such as those previously listed; 6) Other numerous chemical moieties or systems known to those skilled in the art of solids dispersion, emulsion or flotation technology.

Solids that are known to those skilled in the art to be of aid or benefit or act as a burnable, combustible or explosive fuel may be acceptable for use in multiple phase emulsion applications. Some typical solids that may find use in multiple phase emulsion applications are not limited to but: 1) Coal particulates; 2) Coke particulates; 3) grain dust; 4) various burnable, combustible or explosive organic solids; 5) Various burnable, combustible or explosive inorganic solids; 6) Gas encapsulating glass or plastic beads or gels; 7) Various other solid components that may be of benefit to the burning, combusting or exploding of the multiple phase emulsion known to the skilled burner fuel, combustion or explosives technologists.

General Procedure of Manufacture No. 1

An acceptable general procedure of manufacture for creating multiple phase emulsions comprised of alternating water and oil phases or alternating immiscible oil phases is illustrated in FIG. 3. In FIG. 3 the most internal phases are created in mixer or emulsifying apparatus No. 1 36 where either an oil in water or water in oil emulsion is formed. The exit stream of mixer or emulsifying apparatus No. 1 36 is the entrance feed to mixer or emulsifying apparatus No. 2 42. In mixer or emulsifying apparatus No. 2 42 the finished product is formed by emulsifying the discharge form mixer or emulsifying apparatus No. 1 36 as a discontinued multiple phase composed of either water in oil or oil in water into a continuous phase of either water or oil. A more concise description for illustrative purposes would be the creation of a water in oil portion of the finished product in mixer or emulsifying apparatus No. 1 36 to be the intermediate mixture or substrate emulsified as a discontinuous phase in a continuous water phase produced in mixer or emulsifying apparatus No. 2 42 where in the finished product is formed. Under microscopic observation, this final product would have the physical appearance as illustrated in FIG. 1 of this disclosure. It is assumed that those skilled in the art of burner fuel, combustion or explosives technology would be aware of the use of acceptable chemical moieties of other additives such as but not limited to those described in previous sections to accentuate the formation of each phase in the appropriate manor. It is further assumed that those skilled in the art of emulsion technology would realize that there may be even more practical applications to more phases above the general three phase system presented in this disclosure and that this disclosure is not limiting itself to only a three phase system but rather is illustrating and teaching the practical application of multiple phase systems.

General Procedure of Manufacture No. 2

General Procedure of Manufacture No. 2 involves the use of only one mixer or emulsifying apparatus and a combination of chemicals balanced according to their HLB (Hydrophilic—Lipophilic Balance) and that of the components of the multiple phase emulsion.

This procedure and technique is more specific to a three phase system consisting of either W/O/W or O/W/O alternating phases. This procedure or technique would not prevent those skilled in the art of burner fuel, combustion, emulsion or explosive technology form realizing the applications toward further multiple phases (emulsions of >3 phases) or the incorporation of other states of matter other than liquids (i.e. solids and or gasses) into the overall multiple phase emulsion system.

It is known in the art that multiple phase emulsions may be created by using a ration of very low HLB chemicals that are commonly used to create W/O emulsions in combination with very high HLB chemicals that are commonly used to create O/W emulsions so as to match the HLB of the oil portion of the multiple phase emulsion. When this ratio is achieved and matches the HLB of the oil portion and these chemicals, oil and water are mixed in an acceptable mixer or emulsifying apparatus the resulting product will have the physical appearance upon examination under a microscope as depicted in FIG. 1 of this disclosure.

Therefore, it is the application of the procedure and technique to practical applications in burner fuel, combustion and explosives technology that is of significance to the art. There is also the practical and commercial application of process cost reduction as there is only one mixer or emulsifying apparatus used in creating the multiple phase emulsion.

It is assumed that those skilled in the art of burner fuel, combustion, emulsion and explosives technology would be aware of or possess knowledge that certain chemical moieties or combinations may go in either the oil or the water phase or both depending upon the specific chemical moieties being combined with the desired oils. It is further assumed that those skilled in the art of burner fuel, combustion, emulsion and or explosives technology would be aware of or possess knowledge that various types of burnable solids or other additives may accentuate the final multiple phase emulsion product. Those additives may be but are not limited to those previously disclosed which may act as or be surface-active agents, finely divided solids or other such partitioning, dispersing or end product performance agents or enhancements.

General Procedure of Manufacture No. 3

General Procedure of Manufacture No. 3 involves the use of only one mixer of emulsifying apparatus to create multiple phase emulsions. The procedure and or technique involves the use of a type of mixer or emulsifying apparatus that will allow for multiple entry ports along its mixing or emulsifying chamber. There should be sufficient distance and time presumably based upon component characteristic and volumes between the entry ports of the mixing or emulsifying chamber to allow for the creation of each phase of the multiple phase emulsion to allow for the creation of each phase of the multiple phase emulsion to form before the next portion is introduced through its respective entry port. The location of each entry port would most likely be, but is not limited to being determined based upon each components individual characteristic, position in the multiple phase emulsion, volumes, temperature and other such parameters consistent with the overall scope of the multiple phase emulsion. It should be assumed that those skilled in the art of burner fuel, combustion, emulsion and/or explosives technology would conclude as a result of the teachings of this disclosure that entry ports for each component of the multiple phase emulsion would be or could be, determined by empirical and or experimental methods and may likely be specific for each system.

Summary Overview of General Procedure of Manufacture

The three previous procedures and/or techniques for the manufacture of multiple phase emulsions are offered to illustrate the number of wide and varied procedures and or techniques available to and known by those skilled in the art of burner fuel, combustion, emulsion and or explosives technology. By no means does the descriptions of the above three general procedures of manufacture constitute the only possible procedures and/or techniques available to those skilled in the art. Multiple phase emulsions may be created by any technique suitable to the skilled artisan in order to achieve the desired multiple phase emulsion product. This would included but not be limited to such physical procedures and or techniques of manufacture as modifications to those illustrated in U.S. Pat. No. 4,430,251 or the use of static mixers, in line mixers or other such mechanical devices which may be but is not limited to the previously defined high and or low pressure operations and or combinations of mechanical devices with and or without various chemical moieties to achieve multiple phase emulsions as a final product.

It should be assumed by those skilled in the art of burner fuel, combustion, emulsion and or explosives technology that as a result of the teachings of this disclosure that certain combinations of chemical moieties and mechanical devices may be specific but is not limited to certain cost performance parameters for specific applications which are within the scope of this disclosure.

It should also be assumed by those skilled in the art of burner fuel, combustion, emulsion and or explosives technology, as a result of the teachings of this disclosure that certain chemical moieties may go in either the oil or the water or both depending upon the specific chemical moieties being combined in relation to the other phases of the multiple phase emulsion. It should further be assumed by those skilled in the art of burner fuel, combustion, emulsion and or explosives technology that as a result of the teachings of this disclosure that certain chemical moieties may go in either the oil phase, the water phase, or both depending upon the specific chemical moieties being combined with specific gasses and or solids and or liquids and or other emulsions. It is also to be assumed by those skilled in the art of burner fuel, combustion, emulsion and or explosives technology and as a result of the teachings of this disclosure that other additives may be but are not limited to those previously disclosed which may or may not act as or be surface active agents, finely divided solids or other such partitioning or dispersing or end product performance agents or enhancements.

Example 1

The procedure or technique used for making this multiple phase emulsion follows that of General Procedure of Manufacture No. 1 of this disclosure and is as follows:

Step 1: Add 728.00 grams of molten asphaltic Vacuum Tower Bottoms (VTB) to a suitable heated container while maintaining heat at approximately 200°±5° F. by a suitable means of heating and agitated with a prop mixer turning at approximately 1550 revolutions per minute.

Step 2: Under agitation, add 4.00 grams of crude lecithin (Centrol 3F-UB, Central Soya) to the molten VTB and maintain temperature at 180° F. to 205° F. It has been found that there are no adverse effects to the final product if this mixture is used immediately or stored for periods exceeding eight (8) hours either hot or cold.

Step 3: Heat 64.00 grams of water to 100° F. to 110° F. in a suitable container with adequate mixing.

Step 4: To the product of Step 3 add 4.00 grams of Aluminum Sulfate of the general formula $Al_2(SO_4)_3 \cdot 14.3H_2O$, mix until dissolved and maintain 90° F. to 110° F. temperature.

Step 5: Heat 22.077 grams of water to 100° F. to 110° F. in a suitable container with adequate mixing.

Step 6: Add 10.00 grams of 100 mole ethylene oxide nonyl phenol to the product of Step 5 with adequate mixing and maintain the results at 100° F. to 110° F. temperature. The pH of this solution should normally be about 6.5 to 8.0 or that of the initial water.

Step 7: Slowly add the resultant mixture of Step 4 to the resulting mixture of Step 3 and maintain the temperature at 180° F. to 205° F. to form a portion of the multiple phase emulsion comprised of W/O.

Step 8: Add 769.23 grams of the resultant mixture of Step 7 (W/O phase) to the resulting mixture of Step 6 while passing through a suitable mixing or emulsifying apparatus and allow the resulting W/O/W emulsion to equalize in temperature and stabilize.

The W/O/W emulsion of Step 8 would under microscopic observation have a physical appearance such as that illustrated in FIG. 1 of this disclosure.

The W/O/W emulsion of Step 8 could find suitable applications as a burner fuel with the following desirable features:

1) Low pumping viscosity (which is characteristic of O/W emulsions);

2) Low degree of separation upon static storage;

3) Acceptable nozzle atomization which is characteristic of O/W emulsion;

4) Secondary atomization of the oil droplet which is characteristic of W/O emulsions;

5) Likely lower $NO_x$ emittance in stack gasses due to the presence of available hydrogens from the water;

6) More efficient burning or higher BTU yields due to the over all increase in atomization of the fuel (oil) droplet which resulted form the formation and use of the multiple phase emulsion in this application.

The Formula of Example 1 would be as follows based upon total weight of final product:

| % | Product |
|---|---|
| 69.999 | Vacuum Tower Bottoms |
| 0.385 | Lecithin, Centrol 3F-UB from Central Soya |
| 0.385 | Aluminum Sulfate |
| 28.231 | Water |
| 1.000 | T-Det N-100, 100 mole Ethylene Oxide Nonyl Phenol from Harcros Chemical |

Example 2

The procedure of technique used for making this multiple phase emulsion follows that of General Procedure of Manufacture No. 1 but illustrates the use of different chemical moieties than those used in Example No. 1 of this disclosure and is as follows:

Step 1: Add 1638.00 grams of molten asphaltic Vacuum Tower Bottoms (VTB) to a suitable heated container while maintaining heat at approximately 200°±5° F. by a suitable means of heating and agitated with a prop mixer turning at approximately 1550 revolutions per minute.

Step 2: Under agitation, add 9.00 grams of crude lecithin (Centrol 3F-UB, Central Soya) to the molten VTB and maintain temperature at 180° F. to 205° F. It has been found that there are no adverse effects to the final product if this mixture is used immediately or stored for periods exceeding eight (8) hours either hot or cold.

Step 3: Heat 144.00 grams of water to 100° F. to 110° F. in a suitable container with adequate mixing.

Step 4: To the product of Step 3 add 9.00 grams of Aluminum Sulfate of the general formula $Al_2(SO_4)_3 \cdot 14.3H_2O$, mix until dissolved and maintain 90° F. to 110° F. temperature.

Step 5: Heat 416.40 grams of water to 100° F. to 110° F. in a suitable container with adequate mixing.

Step 6: Add 30.00 grams of Crude Tall Oil, 10.00 grams of 10 mole Borax and 6.00 grams of NaOH pellets to Step 5 with adequate mixing; adjust the pH to above 11.0; maintain at 100° F. to 110° F. temperature.

Step 7: Slowly add the resultant mixture of Step 4 to the resulting mixture of Step 3 and maintain the temperature at 180° F. to 205° F. to form a portion of the multiple phase emulsion comprised of W/O.

Step 8: Add 1540.0 grams of the resultant mixture of Step 7 (W/O phase) to the resulting mixture of Step 6 while passing through a suitable mixing or emulsifying apparatus and allow the resulting W/O/W emulsion to equalize in temperature and stabilize.

The W/O/W emulsion of Step 8 would under microscopic observation have a physical appearance such as that shown in FIG. 1 of this disclosure.

The W/O/W emulsion of Step 8 could find suitable applications as a burner fuel with the following desirable features:

1) Low pumping viscosity (which is characteristic of O/W emulsions);

2) Low degree of separation upon static storage;

3) Acceptable nozzle atomization which is characteristic of O/W emulsion;

4) Secondary atomization of the oil droplet which is characteristic of W/O emulsions;

5) Likely lower $NO_x$ emitance in stack gasses due to the presence of available hydrogens from the water;

6) More efficient burning or higher BTU yields due to the over all increase in atomization of the fuel (oil) droplet which resulted from the formation and use of multiple phase emulsions in this application.

The Formula of Example 1 would be as follows based upon total weight of final product:

| % | Product |
|---|---|
| 70.070 | Vacuum Tower Bottoms |
| 0.385 | Lecithin, Centrol 3F-UB from Central Soya |
| 0.385 | Aluminum Sulfate |
| 26.860 | Water |
| 1.500 | Crude Tall Oil from Georgia Pacific, Arkansas |
| 0.500 | 10 mole Borax from U.S. Borax |
| 0.300 | NaOH - Caustic Soda pellets or otherwise adjust to pH >11.0 |

Example 3

The procedure of technique used for making this multiple phase emulsion follows that of General Procedure of Manufacture No. 1 but illustrates the use of different chemical moieties than those used in Example No. 1 or Example No. 2 of this disclosure and is as follows:

Step 1: Add 1875.00 grams of molten asphaltic Vacuum Tower Bottoms (VTB) to a suitable heated container while maintaining heat at approximately 200°±5° F. by a suitable means of heating and agitated with a prop mixer turning at approximately 1550 revolutions per minute and recirculating through a recirculation line equipped with a recirculation line by pass arrangement.

Step 2: Heat 100.00 grams of water to 100° F. to 110° F. in a suitable container with adequate mixing.

Step 3: To the product of Step 2 add 2.50 grams of Product S-2 commercially available from Kramer Chemical, N.J., USA which is known to be a W/O emulsifier package (A composition of 92.00% MgOH; one emulsifier with an HLB of <10 & two emulsifiers >10 HLB to total the balance of 8.00%) and enough NaOH to adjust the pH to a range of 9 to 10 pH units. Maintain the temperature of this chemical solution at 85° to 110° F. until used.

Step 4: Heat 587.50 grams of water to 100° F. to 110° F. in a suitable container with adequate mixing.

Step 5: With Adequate mixing, add ≈5.09 grams HCl@20° Be concentration to Step 4 followed by the addition of a 18.75 grams of an Experimental Emulsifier Blend #2 which consists of approximately 45.0% $C_{18}$ Quaternary Ammonium Chloride, 8.333% $C_{18}$ Diamine, ≈41.666% Diethylene glycol, 3.6% Isopropyl Alcohol and water (as needed) to form the balance of the emulsifier blend; add 3.75 grams of $CaCl_2$, adjust pH to below 3 and preferably between 1.5 and 2.5 pH units; maintain at 85° F. to 110° F. temperature.

Step 6: Slowly add the resultant mixture of Step 3 to the resulting mixture of Step 1 while mixing with suitable mixer and circulating through a gear pump and simultaneously allowing small quantities of the now forming or formed W/O emulsion to either by pass the return and enter the resultant mixture of Step 5 or return to the original container of Step 1 to be circulated and/or pass through the gear pump again. Maintain the temperature at 180° F. to 205° F. to form a portion of the multiple phase emulsion comprised of W/O as the mixture is being mixed and passing through the gear pump.

Step 7: Continue the procedure of Step 6 until all the resultant mixture of Step 3 is added to the mixing and circulating resultant mixture of Step 1 until all the mixture of Step 3 is added to the resultant mixture of Step 1 and introduced into the resultant mixture of Step 5 as described in Step 6.

The W/O/W emulsion of Step 7 would under microscopic observation have a physical appearance such as that shown in FIG. 1 of this disclosure.

The W/O/W emulsion of Step 7 could find suitable applications as a burner fuel with the following desirable features:

1) Low pumping viscosity (which is characteristic of O/W emulsions);
2) Low degree of separation upon static storage;
3) Acceptable nozzle atomization which is characteristic of O/W emulsion;
4) Secondary atomization of the oil droplet which is characteristic of W/O emulsions;
5) Likely lower $NO_x$ emitance in stack gasses due to the presence of available hydrogens from the water;
6) More efficient burning or higher BTU yields due to the over all increase in atomization of the fuel (oil) droplet which resulted from the formation and use of multiple phase emulsions in this application.

The Formula of Example 3 would be as follows based upon total weight of final product:

| %      | Product                                                      |
|--------|--------------------------------------------------------------|
| 75.000 | Vacuum Tower Bottoms                                         |
| 0.100  | Product S-2 from Kramer Chemical                             |
| ≈0.010 | NaOH, 50% conc.                                              |
| 27.500 | Water - ≈4.0% of which is in the W/O phase @ pH ≈ 10.0       |
| 0.150  | $CaCl_2$                                                     |
| 0.750  | Experimental Emulsifier Blend #2                             |
| ≈0.200 | HCl @ 20° Be Concentration or as needed to pH 1.5 to 3.0 in final water phase |

Example 4

The procedure of technique used for making this multiple phase emulsion follows that of General Procedure of Manufacture No. 1 but illustrates the use of different chemical moieties than those used in Example No. 1 or Example No. 2 and different asphaltic material than that used in Example No. 3 of this disclosure and is as follows:

Step 1: Add 1875.00 grams of molten asphaltic VTB commonly known in the industry as AC-20 to a suitable heated container while maintaining heat at approximately 245°±5° F. by a suitable means of heating and agitated with a prop mixer turning at approximately 1550 revolutions per minute and recirculating through a recirculation line equipped with a recirculation line by pass arrangement.

Step 2: Heat 100.00 grams of water to 100° F. to 110° F. in a suitable container with adequate mixing.

Step 3: To the product of Step 2 add 2.50 grams of Product S-2 available from Kramer Chemical, N.J., USA which is known to be a W/O emulsifier package (A composition of 92.00% MgOH; one emulsifier with an HLB of <10 & two emulsifiers >10 HLB to total the balance of 8.00%) and enough NaOH to adjust the pH to a range of 9 to 10 pH units. Maintain the temperature of this chemical solution at 85° to 110° F. until used.

Step 4: Heat 587.50 grams of water to 100° F. to 110° F. in a suitable container with adequate mixing.

Step 5: With adequate mixing, add ≈5.09 grams HCl @20°Be concentration to Step 4 followed by the addition of a 1.25 grams of a Ethoxylated (3 moles) Tallow diamine ($C_{18}$ diamine), 6.75 grams of a Tallow trimethyl Ammonium Chloride ($C_{18}$ Quaternary Ammonium Chloride), 4.50 grams of Isopropyl Alcohol as a solvent for the Tallow trimethyl Ammonium Chloride, 2.50 grams $CaCl_2$, 5.00 grams of Ethylene Glycol, ≈2.50 grams of HCl @20°Be concentration or as needed to adjust the pH to below 3 and preferably between 1.5 and 2.5 pH units; maintain at 85° F. to 110° F. temperature. The pH of this solution was 1.22 pH units.

Step 6: Slowly add the resultant mixture of Step 3 to the resulting mixture of Step 1 while mixing with suitable mixer and circulating through a gear pump and simultaneously allowing small quantities of the now forming or formed W/O emulsion to either by pass the return and enter the resultant mixture of Step 5 or return to the original container of Step 1 to be circulated and or pass through the gear pump again. Maintain the temperature at 180° F. to 205° F. to form a portion of the multiple phase emulsion comprised of W/O as the mixture is being mixed and passing through the gear pump.

Step 7: Continue the procedure of Step 6 until all the resultant mixture of Step 3 is added to the mixing and circulating resultant mixture of Step 1 until all the mixture of Step 3 is added to the resultant mixture of Step 1 and introduced into the resultant mixture of Step 5 as described in Step 6.

The W/O/W emulsion of Step 7 would under microscopic observation have a physical appearance such as that shown in FIG. 1 of this disclosure.

The W/O/W emulsion of Step 7 could find suitable applications as a burner fuel with the following desirable features:

1) Low pumping viscosity (which is characteristic of O/W emulsions);
2) Low degree of separation upon static storage;
3) Acceptable nozzle atomization which is characteristic of O/W emulsion;
4) Secondary atomization of the oil droplet which is characteristic of W/O emulsions;
5) Likely lower $NO_x$ emitance in stack gasses due to the presence of available hydrogens from the water;
6) More efficient burning or higher BTU yields due to the over all increase in atomization of the fuel (oil) droplet which resulted from the formation and use of multiple phase emulsions in this application.

The Formula of Example 4 would be as follows based upon total weight of final product:

| % | Product |
|---|---|
| 75.000 | Asphaltic VTB Known as AC-20 |
| 0.100 | Product S-2 from Krimer Chemical |
| 27.500 | Water - ≈6.0% of which is in the W/O phase at pH ≈ 7.0 to 8.0 |
| 0.100 | $CaCl_2$ |
| 0.050 | Ethoxylated (3 moles) Tallow diamine ($C_{18}$ diamine) |
| 0.270 | Tallow trimethyl Ammonium Chloride ($C_{18}$ Quaternary Ammonium Chloride) |
| 0.180 | Isopropyl Alcohol |
| ≈0.100 | HCl @ 20° Be Concentration or as needed to pH 1.0 to 3.0 in final water phase |
| 0.200 | Ethylene Glycol |

In Table I below, the resulting data and other pertinent information on the final product W/O/W emulsion for each of the examples above is summarized.

TABLE I

Summary of W/O/W Emulsions of Example 1 through Example 4

| Test/Example | Example 1 | Example 2 | Example 3 | Example 4 |
|---|---|---|---|---|
| Type Oil Phase | VTB - AC-20 | VTB - AC-20 | VTB - Soft | VTB - AC-20 |
| B&R Soft Pt. °F. (°C.) | 124 (≈51.3) | 124 (≈51.3) | 90 (≈33.0) | 124 (≈51.3) |
| Abs. Visc., cP | 237,911 | 237,911 | 19,350 | 237,911 |
| SFS Visc., sec @ 122° F. | Too Thick to Test | <Ex. 1 but too Thick | 157 | 73 |
| Final Oil Phase, Wt. % | N/A High SFS Visc. | 72.01 | 71.72 | 71.31 |
| Visc. Ratio | N/A | N/A | 1/1515 | 1/3259 |
| Stg. Stab., mo | 0.25* | ≈4.0 | >9.0 | >15.0 |
| pH Final Phase | 7.0–8.0 | >11.0 | 2.0–3.0 | 1.22 |

*Example 1 actually separated into 3 distinct layers of W/O/W on top, water in the middle and asphaltic oil on the bottom.

Explanation of Tests

The Ball & Ring Softening Point (B&R Soft Pt.) test was performed in accordance with ASTM D-36.

The Absolute Viscosity test was performed in accordance with ASTM D-2171 with the data recorded in units of centipoise (cP) in place of the normal reporting practice of Poise (P). By definition, 100 centipoise (cP)=1 Poise (P). This reporting procedure was adopted for convenience of data comparison. The accepted test as per ASTM D-2171 at 140° F. (60° C.) was used throughout this work.

The Saybolt Furol Seconds (SFS) viscosity was performed in accordance with ASTM D-88. The standard test temperature is 122° F. (50° C.) was used in this work with the data reported in seconds as per ASTM D-88 test procedure.

The final oil or VTB—Asphaltic material content (Final Oil Phase, WT. %) of each emulsion was determined by adding a known amount of Multiple Phase Emulsion and recorded as wight I, to a previously weighed (and recorded as T) metal quart can. This material and container was then placed upon a hot plate of sufficient heating capacity and so set so as to boil all water volatilize from the contents of the Multiple Phase Emulsion leaving only the initial VTB Asphaltic material which is then weighed and recorded as F. The result is expressed as the Final weight percent of the Oil Phase. The formula for calculating the Final Oil Phase, Wt. % would be as follows: Final Oil Phase, Wt.% =[(I-T)/(F-T)] ×100.

Viscosity Ratio (Visc. Ratio) is the ratio of the Saybolt Furol Seconds viscosity expressed in units of seconds over the Absolute Viscosity expressed in units of cP. Therefore the units of the Viscosity Ratio would be seconds/cP. This Viscosity Ratio value is used to determine the degree of viscosity reduction of the disclosed Multiple Phase Emulsion process.

Storage Stability (Stg. Stab.) was measured by observations of clear sealed containers of each emulsion stored at ambient temperature (≈25° C.) undisturbed until tested or removed from the test program due to instability. The emulsions which were determined by observation to have sufficient stability to warrant further testing were then opened to have the SFS viscosity test ran.

The pH of each emulsion's final water phase (pH Final Phase) was determined by either litmus paper or an Orian Model 520 pH meter with temperature compensation probe or both the litmus paper and pH meter to cross reference each to the other.

Discussion of Data and Formulary

One of the first observations of the data in Table I is that by decreasing the pH of the chemical solution in Example 1 has a pH ≈7.0 to 8.0 and has the lowest Storage Stability value of any of the emulsions. Example I illustrates current state of the art.

Example 2 teaches improved Storage Stability by adjustment to pH greater than 11.0. Example 3 and Example 4 teach that pH below 3.0 may also improve Storage Stability. The greatly improved Storage Stability of Example 3 and Example 4 were accomplished by incorporation of the $CaCl_2$ and a glycol (a type of alcohol component in the formula. From the data of Example 3 and Example 4 in Table I, one may now conclude that either diethylene glycol as taught in Example 3 or ethylene glycol as taught in Example 4 may be used to improve Storage Stability.

It would be obvious to one now skilled in the art of improved Multiple Phase Emulsions that other members of the glycol family may have suitable application as taught here in. Selection of the glycol component would most likely be determined by economic as well as technical considerations.

In Example 3 and Example 4, the use of the Ethyoxylated Tallow Diamine incorporates improved efficiency in emulsification. The improved efficiency in emulsification results in better over all stability. For emulsifiers such as Ethoxylated Tallow Diamine to be effective, a pH below 3.5 is desirable. This over all effect of improvement to the Multiple Phase Emulsion process is most desirable when emulsifying with heavy hydrocarbon oils. Such improvements by the use of Ethoxylated Tallow Diamine to Multiple Phase Emulsion processes were not previously known in the art. Other nonlimiting diamines which may find utility in Multiple Phase Emulsions could be variations of coco, coconut, soya or others and their ethyoxylated or propoxylated derivatives.

Another result of the teachings of this disclosure is the ability of the Multiple Phase Emulsion process to combine water phases of opposing pH values into one single emulsion system. This feature is taught in the formula and data in Table I of Example 3. In Example 3, the internal water phase had a pH of 10 while a pH of 2.0 to 3.0 exists in the external phase of the Multiple Phase Emulsion.

Example 3 and Example 4 teach the art of greatly reduced Multiple Phase Emulsion viscosity as measured by Saybolt Furol Seconds (SFS) over that of the initial asphaltic VTB oil. The resulting low SFS viscosity is achieved by the addition of both $CaCl_2$ and the glycol component in each formula.

It would be obvious to one now skilled in the art of improved Multiple Phase Emulsions that other metal salts such as NaCl or MgCl or the acetate version of such salts may have suitable application as taught here in. An obvious derivation from $CaCl_2$ to NaCl would be in applications of the disclosed embodiment where a pH of 10.0 or greater exists in One of the water phases. The use of $CaCl_2$ in emulsion systems of >10.0 pH is known to break or otherwise make unstable the emulsion system. In such systems and for economic reasons, NaCl is a logical selection as it is known to be compatible with emulsions in this pH range.

Where environmental concerns dictate, selection of the acetate version of such salts as described above may be desired. In general, the acetate version of such salts are considered more environmentally safe.

Absolute Viscosity is commonly used in the asphalt industry to measure the viscosity at 140° F. (60° C.) of asphaltic materials in units of Poise. Asphaltic emulsion viscosity is normally measured in terms of Saybolt Furol Seconds at 122° F. (50° C.) in units of seconds. When working with highly viscous materials which are or may be solid or semi solid at 122° F. (50° C.) as evidenced by the Ball & Ring Softening Point data in Table I, a conventional comparison of viscosity reduction at equal temperatures is not practical. As a result the viscosity reduction was measured by the Viscosity Ratio method previously described. From the data for Viscosity Ratio in Table I, Example 3 and Example 4, viscosity reductions in the magnitude of 1/1000 or greater may be achieved by application of the teachings disclosed herein.

From these teachings described in this disclosure, one obvious application to heavy hydrocarbon oils that have viscosities measurable at 122° F. (50° C.) is that such heavy hydrocarbon oils may now constitute a greater portion of the final product composition than previously known in the art. Multiple Phase Emulsions made from such heavy hydrocarbon oils would be expected to still have acceptable viscosity values.

In any of these examples and from the teachings of this disclosure, those skilled in the art of burner fuel, combustion, emulsion and or explosives technology would know that there exists many suitable means by which multiple phase emulsions may be created beyond those given in this disclosure which would offer advances in the art of each specific occurrence of use and that these advances are a result of the teachings and scope of this disclosure.

It should be understood that the amounts of the chemical components in Examples 1, 2, 3 and 4 are for exemplification purposes only and that an acceptable range exists for the purposes of this invention.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of making a multiple phase emulsion or gel, comprising the steps of:

adding molten asphaltic vacuum tower bottoms to a heated first container;

maintaining said first container at a temperature of at least 200° F.;

agitating the vacuum tower bottoms in the first container;

adding lecithin to the vacuum tower bottoms to form a solution;

maintaining this solution within a temperature range of at least 180° F.;

heating water to at least 100° F. in a second container;

adding aluminum sulfate of the general formula $Al_2(SO_4)_3 \cdot 14.3H_2O$ to the water in the second container to form a mixture;

mixing the mixture in the second container until the $Al_2(SO_4)_3 \cdot 14.3H_2O$ is dissolved;

maintaining the mixture in the second container within a temperature range of at least 90° F.;

heating water to a temperature of at least 100° F. in a third container;

adding ethylene oxide nonyl phenol to the water in the third container to form a resultant product;

maintaining the temperature of the resultant mixture in the third container above 100° F.;

adding the solution in the first container to the mixture in the second container to form a portion of the multiple phase emulsion consisting of water in oil;

maintaining the portion of the multiple phase emulsion consisting of water in oil at a temperature above 180° F.; and combining the multiple phase emulsion consisting of water in oil in the second container with the resultant product in the third container in a mixing apparatus;

mixing said combination to form at least a water/oil/water emulsion.

2. A method of making a multiple phase emulsion or gel, comprising the steps of:

adding molten asphaltic vacuum tower bottoms to a heated first container;

maintaining said first container at a temperature of at least 200° F.;

agitating the vacuum tower bottoms in the first container;

adding lecithin to the vacuum tower bottoms to form a solution;

maintaining this solution within a temperature range of at least 180° F.;

heating water to at least 100° F. in a second container;

adding aluminum sulfate of the general formula $Al_2(SO_4)_3 \cdot 14.3H_2O$ and borax to the water in the second container to form a mixture;

mixing the mixture in the second container until the $Al_2(SO_4)_3 \cdot 14.3H_2O$ is dissolved;

maintaining the mixture in the second container within a temperature range of at least 90° F.;

heating water to a temperature of at least 100° F. in a third container;

adding crude tall oil and NaOH to the water in the third container to form a resultant product and adjusting the pH of the resultant product in the third container above 10.0;

maintaining the temperature of the resultant mixture in the third container above 100° F.;

adding the solution in the first container to the mixture in the second container to form a portion of the multiple phase emulsion consisting of water in oil;

maintaining the portion of the multiple phase emulsion consisting of water in oil at a temperature above 180° F.;

combining the multiple phase emulsion consisting of water in oil in the second container with the resultant product in the third container in a mixing apparatus; and mixing said combination to form at least a water/oil/water emulsion.

3. A method of making a multiple phase emulsion of at least two opposing pH values in at least two water phases of the emulsion or gel comprising the steps of:

adding molten asphaltic vacuum tower bottoms to a heated first container;

maintaining said first container at a temperature of at least 200° F.;

heating water to about 100° F. in a second container;

adding emulsifier blends known to create W/O emulsions and NaOH to the water in the second container and adjusting the pH to about 10 to form a mixture;

heating water to about 100° F. in a third container;

adding quaternary ammonium chloride emulsifiers, diamine emulsifiers, salts of Na or Ca, glycols and HCl to adjust the pH to below 3.0 to form a mixture;

mixing the mixture in the second container with that of the first container while passing small portions of the resulting mixture into the third container until the contents of both the first container and second container are combined and mixed with the third container to form said water/oil/water emulsion of two opposing pH values.

4. A method of making a multiple phase emulsion or gel comprising the steps of:

adding molten asphaltic vacuum tower bottoms to a heated first container;

maintaining said first container at a temperature of at least 200° F.;

heating water to about 100° F. in a second container;

adding emulsifier blends known to create W/O emulsions to form a mixture;

heating water to about 100° F. in a third container;

adding quaternary ammonium chloride emulsifiers, diamine emulsifiers, salts of Na or Ca, glycols and HCl as needed to adjust the pH to below 3.0 to form a mixture, wherein said glycols are added to lower viscosity;

mixing the mixture in the second container with that of the first container while passing small portions of the resulting mixture into the third container until the contents of both the first container and second container are combined and mixed with the third container to form said water/oil/water emulsion of two opposing pH values.

* * * * *